US010392061B2

(12) United States Patent
Mizusawa

(10) Patent No.: US 10,392,061 B2
(45) Date of Patent: Aug. 27, 2019

(54) SPROCKET AND ELASTIC CRAWLER DRIVE MECHANISM

(71) Applicant: BRIDGESTONE CORPORATION, Tokyo (JP)

(72) Inventor: Takashi Mizusawa, Yokohama (JP)

(73) Assignee: BRIDGESTONE CORPORATION, Tokyo (JP)

(*) Notice: Subject to any disclaimer, the term of this patent is extended or adjusted under 35 U.S.C. 154(b) by 108 days.

(21) Appl. No.: 15/542,700

(22) PCT Filed: Feb. 12, 2016

(86) PCT No.: PCT/JP2016/000743

§ 371 (c)(1),
(2) Date: Jul. 11, 2017

(87) PCT Pub. No.: WO2016/129290

PCT Pub. Date: Aug. 18, 2016

(65) Prior Publication Data

US 2017/0355406 A1 Dec. 14, 2017

(30) Foreign Application Priority Data

Feb. 12, 2015 (JP) ................................ 2015-025418

(51) Int. Cl.

*B62D 55/253* (2006.01)
*B62D 55/12* (2006.01)
*F16H 55/08* (2006.01)
*F16H 55/17* (2006.01)
*B62D 55/24* (2006.01)

(52) U.S. Cl.

CPC ........... *B62D 55/253* (2013.01); *B62D 55/12* (2013.01); *B62D 55/244* (2013.01); *F16H 55/08* (2013.01); *F16H 55/17* (2013.01); *F16H 55/171* (2013.01)

(58) Field of Classification Search

CPC .... B62D 55/253; B62D 55/244; F16H 55/171

(Continued)

(56) References Cited

U.S. PATENT DOCUMENTS 6,698,850 B2 * 3/2004 Ueno ................ B62D 55/0885 305/115
6,848,757 B2 * 2/2005 Ueno ................ B62D 55/0885 305/115

(Continued)

FOREIGN PATENT DOCUMENTS

CN 100579853 C 1/2010
EP 2 554 457 B1 3/2016

(Continued)

OTHER PUBLICATIONS

International Search Report for PCT/JP2016/000743, dated May 17, 2016 (PCT/ISA/210).

(Continued)

*Primary Examiner* — S. Joseph Morano
*Assistant Examiner* — Jean W Charleston
(74) *Attorney, Agent, or Firm* — Sughrue Mion, PLLC

(57) ABSTRACT

A sprocket (10) is capable of engaging with engaging portions (22) on an elastic endless belt (21). On a tooth face (F) of a tooth (12) of the sprocket (10), a portion of a tooth base on at least one side of a center line ($O_1$) of the tooth (12) is a tooth base surface (**12*b*), and the tooth base surface (12*b*) is inclined relative to the center line ($O_1$) of the tooth (12) at an angle ($A_1$) in a range of 0° or greater to 7.5° or less so as to approach the center line ($O_1$) of the tooth (12) towards a tooth tip surface (12*d***).

16 Claims, 3 Drawing Sheets

(58) Field of Classification Search
USPC ................ 305/165, 195, 196, 107, 198, 199
See application file for complete search history.

(56) References Cited

U.S. PATENT DOCUMENTS

| | | | | |
|---|---|---|---|---|
| 6,883,876 | B2 * | 4/2005 | Yamamoto | B62D 55/088 305/115 |
| 7,159,955 | B2 * | 1/2007 | St-Pierre | B62D 55/244 305/168 |
| 7,896,449 | B2 * | 3/2011 | Matsuo | B62D 55/244 305/115 |
| 2008/0211300 | A1 | 9/2008 | Matsuo et al. | |
| 2009/0085899 | A1 * | 4/2009 | Ando | G09G 3/296 345/205 |
| 2017/0355406 | A1 | 12/2017 | Mizusawa | |

FOREIGN PATENT DOCUMENTS

| | | | |
|---|---|---|---|
| JP | 2011-152851 | A | 8/2011 |
| JP | 2011-207315 | A | 10/2011 |
| JP | 2013-067284 | A | 4/2013 |
| JP | 2013-075626 | A | 4/2013 |
| JP | 2014-162311 | A | 9/2014 |
| JP | 2014-162312 | A | 9/2014 |
| WO | 2016/129290 | A1 | 8/2016 |

OTHER PUBLICATIONS

Communication dated Nov. 30, 2018, from the State Intellectual Property Office of People's Republic of China in counterpart Application No. 201680009590.1.

* cited by examiner

SPROCKET AND ELASTIC CRAWLER DRIVE MECHANISM

CROSS REFERENCE TO RELATED APPLICATIONS

This application is a National Stage of International Application No. PCT/JP2016/000743 filed Feb. 12, 2016, claiming priority based on Japanese Patent Application No. 2015-025418, filed Feb. 12, 2015, the contents of all of which are incorporated herein by reference in their entirety.

TECHNICAL FIELD

This disclosure relates to a sprocket and an elastic crawler drive mechanism.

BACKGROUND

Techniques for driving an elastic endless belt by engaging a sprocket with a plurality of engaging portions (core bars) on the endless belt are known. One such technique prevents tooth jumping, which is caused by the driving force or by foreign material getting stuck, by providing the outer surface of the core bars on the sprocket side with a semicircular cross-sectional shape and engaging and catching only a slight portion of the area near the tooth root of the sprocket (for example, see PTL 1: JP 2011-152851 A (PTL 1)).

CITATION LIST

Patent Literature

PTL 1: JP 2011-152851 A

SUMMARY

Technical Problem

By providing the engaging surface of the core bars with a semicircular cross-sectional shape and engaging only a small portion of the core bars and the sprocket, however, the contact area between the core bars and the sprocket is small, placing a large load on the sprocket. With this structure, wear tends to progress in the sprocket.

Therefore, it would be helpful to provide a sprocket and an elastic crawler drive mechanism that reduce wear of the sprocket.

Solution to Problem

To this end, a sprocket according to this disclosure is capable of engaging with a plurality of engaging portions on an elastic endless belt, wherein on a tooth face of a tooth of the sprocket, a portion of a tooth base on at least one side of a center line of the tooth is a tooth base surface, and the tooth base surface is inclined relative to the center line of the tooth at an angle in a range of 0° or greater to 7.50 or less so as to approach the center line of the tooth towards a tooth tip surface.

Wear of the sprocket according to this disclosure is reduced.

In the sprocket according to this disclosure, on the tooth face, a tooth end surface between the tooth base surface and the tooth tip surface may be inclined relative to the center line of the tooth at an angle in a range of 22.5° or greater to 35° or less so as to approach the center line of the tooth towards the tooth tip surface. In this case, the tooth end surface is tapered towards the tooth tip surface. From when the sprocket starts to engage with the engaging portion on the endless belt until the engagement is complete, or from engagement with the engaging portion until disengagement, contact between the engaging portion and the tooth end surface can thus be prevented. Also, any foreign material that is introduced is less likely to be caught. Therefore, the progression of wear can be reliably slowed down.

In the sprocket according to this disclosure, a connecting portion of the tooth end surface connecting to the tooth tip surface may be a curved surface protruding outward from the tooth. In this case, from when the sprocket starts to engage with the engaging portion on the endless belt until the engagement is complete, or from engagement with the engaging portion until disengagement, contact with the engaging portion can be more reliably prevented also near the tooth tip surface on the tooth end surface of the tooth in the sprocket. The progression of wear can thus more reliably be slowed down.

In the sprocket according to this disclosure, a connecting portion between the tooth base surface and the tooth end surface may protrude outward from the tooth. In this case, when the sprocket begins to engage with the engaging portion on the endless belt, or upon disengagement from the engaging portion, contact between the connecting portion and the engaging portion is avoided, thereby even more reliably slowing down the progression of wear.

An elastic crawler drive mechanism according to this disclosure includes any of the aforementioned sprockets and an elastic crawler with a plurality of engaging portions on an elastic endless belt, the engaging portions being capable of engaging with the sprocket, wherein on the tooth face of the sprocket, a root surface between a tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other. The elastic crawler drive mechanism according to this disclosure allows an increase in the contact area between the sprocket and the engaging portions on the endless belt, thereby improving the durability of the sprocket by reducing stress due to the driving force.

Advantageous Effect

According to this disclosure, a sprocket with reduced wear and an elastic crawler drive mechanism with reduced wear of the sprocket can be provided.

DETAILED DESCRIPTION

With reference to the drawings, the following describes various embodiments of the sprocket according to this disclosure and an embodiment of an elastic crawler drive mechanism using the sprocket. As referred to below, the width direction of the elastic crawler is the same as the width direction of an endless belt 21.

Figure 1A:
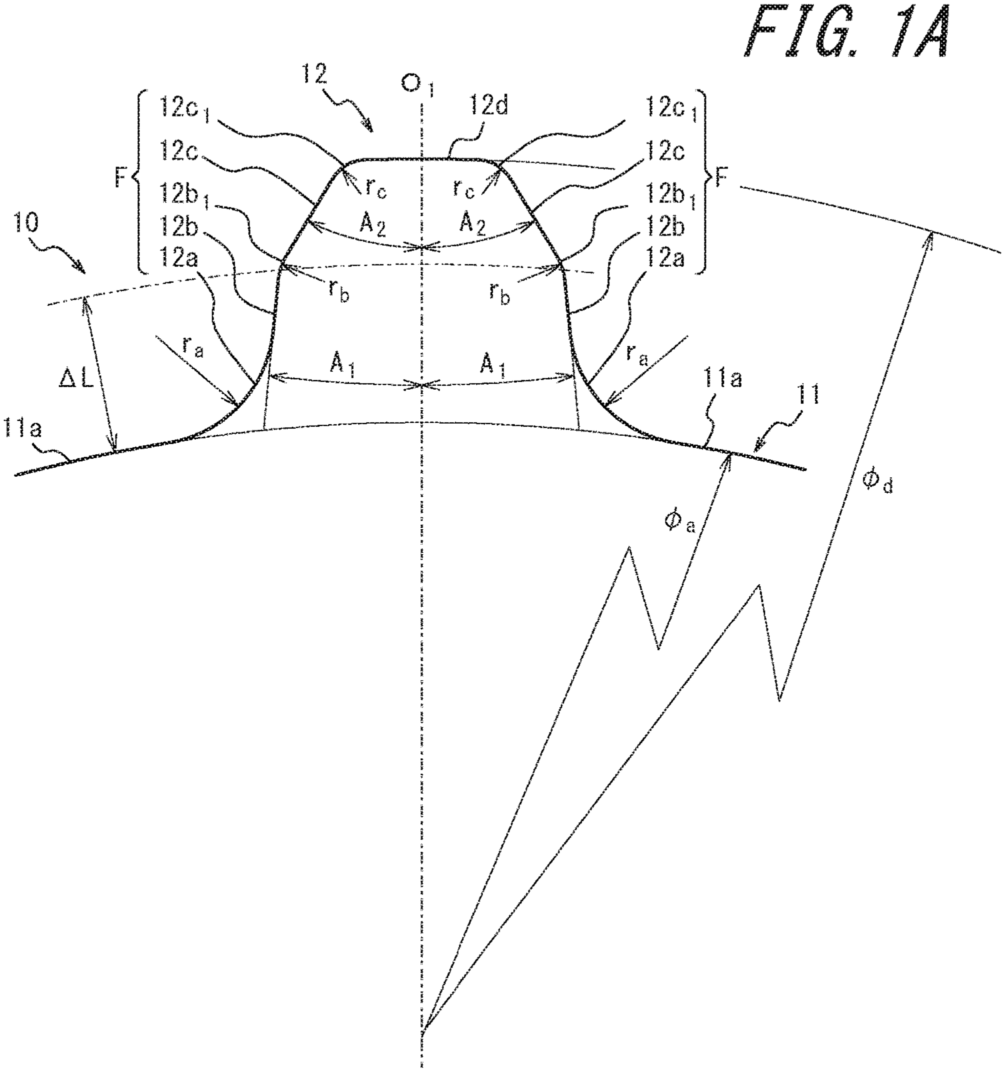
FIG. 1A is a side view schematically illustrating an enlargement of one tooth in a sprocket according to Embodiment 1.

FIG. 1A illustrates a sprocket 10 according to Embodiment 1. The sprocket 10 includes a disk 11 as a rotating member and a plurality of teeth 12 arranged at intervals in the circumferential direction of the disk 11 (only one tooth 12 being illustrated in FIG. 1A). In this embodiment, the outer circumferential surface 11*a* of the disk 11 forms the tooth bottom surface (tooth bottom surface 11*a*). Furthermore, as illustrated in FIG. 1A, the tooth 12 in this embodiment is symmetrical about a center line $O_1$ of the tooth 12 (the line that passes through the center of rotation of the sprocket 10 and divides a tooth tip surface 12*d* of the tooth 12 in equal parts in the circumferential direction of the disk 11). The tooth 12 includes two tooth faces F that are tapered from the tooth bottom surface 11*a* towards the tooth tip surface 12*d*.

In this embodiment, the two tooth faces F each have a root surface 12*a* connecting to the tooth bottom surface 11*a*. The tooth root surfaces 12*a* in this embodiment are each a curved surface protruding inward towards the tooth 12 from the tooth bottom surface 11*a* (towards the center line $O_1$ of the tooth 12). Each tooth root surface 12*a* in this embodiment is formed as a curved surface with a radius of curvature $r_a$. The radius of curvature $r_a$ may be within a range of 10 mm to 20 mm (10 mm≤$r_a$≤20 mm). An example of a specific radius of curvature $r_a$ is 15 mm.

In this embodiment, the two tooth faces F each have a tooth base surface 12*b* connecting to the root surface 12*a*. As illustrated in FIG. 1A, the tooth base surface 12*b* is inclined at an angle $A_1$ relative to the center line $O_1$ of the tooth 12, so as to approach the center line $O_1$ towards the tooth tip surface 12*d*. In this embodiment, the tooth base surface 12*b* is formed as a flat surface. The angle $A_1$ is in a range from 0° to 7.5° (0°≤A≤7.5°). In other words, the opening angle $2A_1$ of the two tooth base surfaces 12*b* in this embodiment is in a range from 0° to 15° (0°≤$2A_1$≤15°). In the case of adopting this range, the tooth base surface 12*b* stands perpendicular, or nearly perpendicular, to the tooth bottom surface 11*a*. In greater detail, the tooth base surface 12*b* in this embodiment is formed as a flat surface inclined at an angle $A_1$=6° relative to the center line $O_1$ of the tooth 12, and the opening angle $2A_1$ of the entire tooth 12 is 12°.

In this embodiment, the two tooth faces F each have a tooth end surface 12*c* connecting to the tooth base surface 12*b*. As illustrated in FIG. 1A, the tooth end surface 12*c* is inclined at an angle $A_2$ relative to the center line $O_1$ of the tooth 12, so as to approach the center line $O_1$ towards the tooth tip surface 12*d*. The tooth end surface 12*c* is formed as a flat surface. The angle $A_2$ may be within a range of 22.5° to 35° (22.5°≤$A_2$≤35°). In other words, the opening angle $2A_2$ of the two tooth end surfaces 12*c* may be within a range of 45° to 70° (45°≤$2A_2$≤700). The tooth end surface 12*c* in this embodiment is formed as a flat surface inclined at an angle $A_2$=30° relative to the center line $O_1$ of the tooth 12, and the opening angle $2A_2$ of the entire tooth 12 is 60°.

The two tooth base surfaces 12*b* in this embodiment are each curved so that a connecting portion 12*b*$_1$ connecting to the tooth end surface 12*c* protrudes outward from the tooth 12 (away from the center line $O_1$ of the tooth 12). The connecting portion 12*b*$_1$ of the tooth base surface 12*b* connecting to the tooth end surface 12*c* in this embodiment is formed as a curved surface with a radius of curvature $r_b$. The radius of curvature $r_b$ may be within a range of 5 mm to 15 mm (5 mm≤$r_b$≤15 mm). An example of a specific radius of curvature $r_b$ is 10 mm.

The two tooth end surfaces 12*c* in this embodiment are each curved so that a connecting portion 12*c*, connecting to the tooth tip surface 12*d* protrudes outward from the tooth 12 (in this embodiment, away from the center line $O_1$ of the tooth 12). The connecting portion 12*c*$_1$ of the tooth end surface 12*c* connecting to the tooth tip surface 12*d* in this embodiment is formed as a curved surface with a radius of curvature $r_c$. The radius of curvature $r_c$ may be within a range of 5 mm to 15 mm (5 mm≤$r_b$≤15 mm). An example of a specific radius of curvature $r_c$ is 5 mm.

The tooth tip surface 12*d* in this embodiment is a flat surface orthogonal to the center line $O_1$ of the tooth 12. The diameter $\phi_d$ of a circle passing through the tooth tip surface 12*d* of the sprocket 10 (tooth tip diameter) and the diameter $\phi_a$ of a circle passing through the tooth bottom surface 11*a* (tooth bottom diameter) may be changed as appropriate. Examples are 485 mm for the tooth tip diameter $\phi_d$ and 419 mm for the tooth bottom diameter $\phi_a$.

Figure 2:
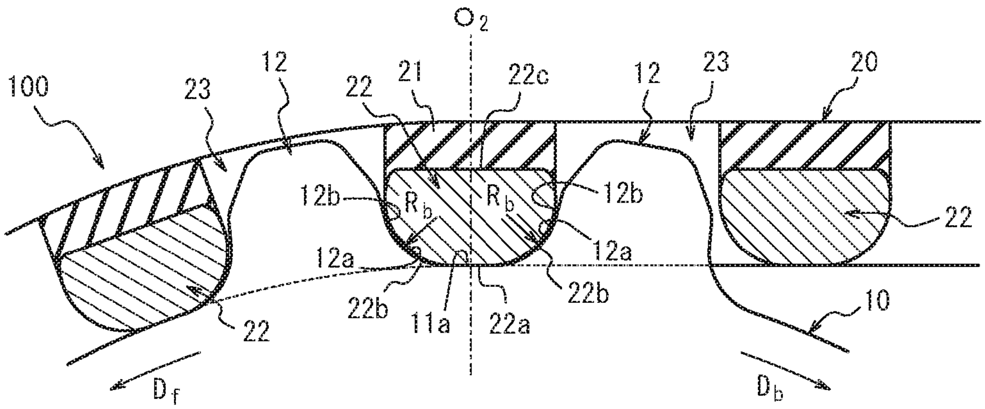
FIG. 2 is a side view schematically illustrating a cross-section of an elastic crawler in an elastic crawler drive mechanism, according to one of the disclosed embodiments, that uses the sprocket in FIG. 1A.

Next, FIG. 2 illustrates an elastic crawler drive mechanism 100, according to an embodiment of this disclosure, using the sprocket 10 of FIG. 1A. In the following explanation, the rotation direction when the sprocket 10 rotates counterclockwise in the figures is designated as a forward rotation direction $D_f$, and the rotation direction when the sprocket 10 rotates clockwise is designated as a backward rotation direction $D_b$. Between the two teeth 12 of the sprocket 10 in FIG. 2, the tooth 12 towards the left is designated as the left tooth (tooth in the forward rotation direction), and the tooth 12 towards the right is designated as the right tooth (tooth in the backward rotation direction). Furthermore, between the two tooth faces F of the teeth 12, the tooth face F towards the left is designated as the tooth face F in the forward rotation direction, and the tooth face F towards the right is designated as the tooth face F in the backward rotation direction.

Reference numeral 20 indicates an elastic crawler with core bars. The elastic crawler 20 includes an elastic endless belt 21 and a plurality of core bars (engaging portions) 22. The endless belt 21 is a belt-shaped member with no end. The endless belt 21 of this embodiment is, for example, formed by vulcanizing a rubber material. The core bars 22 are disposed at intervals in the circumferential direction on the inner circumferential side of the endless belt 21. In this embodiment, a plurality of housings 23 are formed on the endless belt 21 at intervals in the extending direction of the endless belt 21. The housings 23 in this embodiment are each formed between core bars 22 disposed in the circumferential direction of the endless belt 21.

Figure 1B:
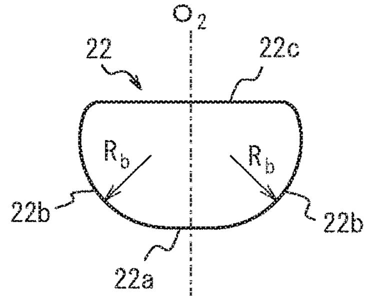
FIG. 1B is a side view schematically illustrating a core bar that is an example of an engaging portion of an elastic crawler that engages with the sprocket in FIG. 1A.

As illustrated in FIG. 2, the core bars 22 each include an edge surface 22*a*, an angled surface 22*b*, and a bottom surface 22*c*. Each core bar 22 extends in the width direction of the elastic crawler 20 (perpendicular to the drawing). The core bar 22 is composed of a metal material, such as iron, formed by casting or forging and is fixed in place to the inner circumference of the endless belt 21 by vulcanizing adhesion or the like. In this embodiment, as illustrated in FIG. 1B, the core bar 22 is formed so that the cross-sectional outline as viewed from the side is symmetrical about the center line $O_2$ of the core bar 22 (the line dividing the edge surface 22*a* of the core bar 22 in two equal parts in the rotation direction (forward and backward direction) of the elastic crawler 20). Also, as illustrated in FIG. 2, the bottom surface 22*c* of the core bar 22 is buried on the outer circumferential side of the endless belt 21, and the edge surface 22*a* is disposed on the inner circumferential side of the endless belt 21.

As illustrated in FIG. 1B, the core bar in this embodiment includes two angled surfaces 22*b*, at an interval in the forward and backward direction, extending in the width direction. As illustrated in FIG. 1B, the two angled surfaces 22*b* are tapered from the bottom surface 22*a* towards the edge surface 22*a*. Each angled surface 22*b* is a curved surface protruding outward from the core bar 22 (in this embodiment, away from the center line $O_2$ of the core bar 22). The two angled surfaces 22*b* in this embodiment are each formed as a curved surface with a radius of curvature $R_b$. The radius of curvature $R_b$ may be within a range of 10 mm to 20 mm (10 mm$\leq R_b \leq$20 mm). An example of a specific radius of curvature $R_b$ is 15 mm. Furthermore, in this embodiment, the edge surface 22*a* connected to the two angled surfaces 22*b* is a flat surface orthogonal to the center line $O_2$ of the core bar 22.

In this embodiment, as illustrated in FIG. 2, when the elastic crawler 20 is wrapped around the sprocket 10, teeth 12 of the sprocket 10 are housed in the housings 23 formed in the endless belt 21 of the elastic crawler 20, whereas core bars 22 of the elastic crawler 20 are each housed in the tooth groove formed between two teeth 12. In this embodiment, when the sprocket 10 is rotated in the forward rotation direction $D_f$, mainly the tooth face F in the forward rotation direction of the right tooth 12 in the sprocket 10 engages with the core bar 22. In the elastic crawler 20 of this embodiment, the edge surface 22*a* of the core bar 22 acts as the engaging surface of the sprocket 10 along with the two angled surfaces 22*b*.

Figure 3:
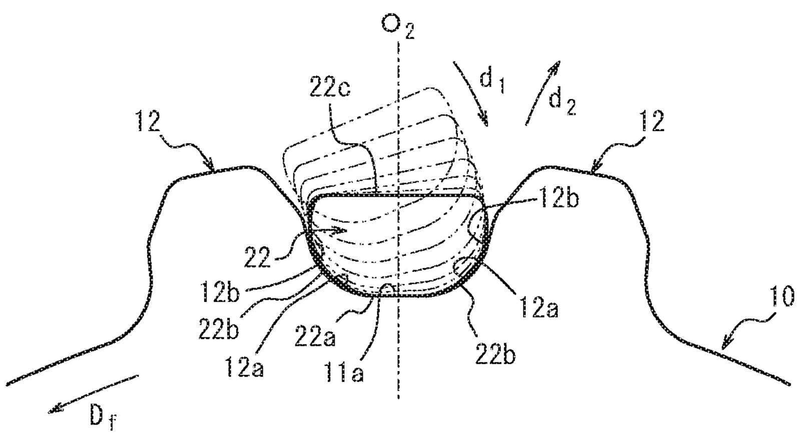
FIG. 3 is an analysis diagram schematically illustrating the trajectory drawn by the core bar when the sprocket rotates in one direction in the elastic crawler drive mechanism in FIG. 2.
Figure 4:
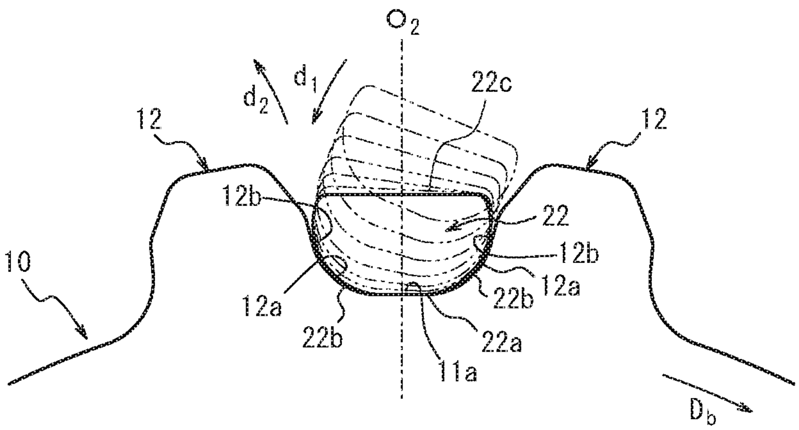
FIG. 4 is an analysis diagram schematically illustrating the trajectory drawn by the core bar when the sprocket rotates in the other direction in the elastic crawler drive mechanism in FIG. 2.

With reference to FIGS. 3 and 4, the operations of the drive mechanism 100 of the elastic crawler 20 that uses the sprocket 10 illustrated in FIG. 1A and FIG. 2 are described.

FIG. 3 illustrates the trajectory of the core bar 22 relative to the sprocket 10 when the elastic crawler 20 is driven by rotating the sprocket 10 in the forward rotation direction $D_f$. Upon the sprocket 10 rotating in the forward rotation direction $D_f$, the elastic crawler 20 is wrapped around the sprocket 10, causing the core bar 22 of the elastic crawler 20 to enter perpendicularly into the tooth groove formed between two teeth 12 of the sprocket 10 along the arrow $d_1$ while moving along an involute curve.

In this embodiment, the tooth base surface 12*b* of the tooth 12 in the sprocket 10 is inclined relative to the center line $O_1$ of the tooth 12 at the angle $A_1$. This angle $A_1$ is in a range from 0° to 7.5° (0°$\leq A_1 \leq$7.5°). In this case, even if the core bar 22 wrapped around the elastic crawler 20 moves along an involute curve, the core bar 22 enters perpendicularly into the tooth groove formed between two teeth 12 while reducing contact with the tooth base surface 12*b*, in the backward rotation direction, of the left tooth 12 in the sprocket 10 and contact with the tooth base surface 12*b*, in the forward rotation direction, of the right tooth 12. The angled surface 22*b*, of the core bar 22, to the right in FIG. 3 (the angled surface in the backward rotation direction) then catches on and engages with the root surface 12*a*, in the forward rotation direction, of the right tooth 12 in the sprocket 10. In other words, in this embodiment, the core bar 22 of the elastic crawler 20 can engage with the sprocket 10 while hardly contacting the tooth base surfaces 12*b* of the teeth 12 in the sprocket 10. As a result, the sprocket 10 can drive the elastic crawler 20 in the forward rotation direction $D_f$ by transmitting the driving force to the elastic crawler 20 through the sprocket 10.

Upon further rotation of the sprocket 10, the wrapped elastic crawler 20 is released from the sprocket 10 at the bottom of the sprocket 10 (not illustrated). At this time, when the core bar 22 of the elastic crawler 20 separates from the tooth groove of the sprocket 10 after the core bar 22 and the teeth 12 of the sprocket 10 have been engaged, the core bar 22 traces a trajectory in the direction of the arrow $d_2$ along an involute curve. By tracing such a trajectory, the core bar 22 also has less contact with the tooth base surfaces 12*b* of the teeth 12 in the sprocket 10 when the wrapped elastic crawler 20 is released from the sprocket 10. Accordingly, upon further rotation of the sprocket 10, the core bars 22 of the elastic crawler 20 can also be released from engagement with the sprocket 10 almost without contact with the tooth base surfaces 12*b* of the teeth 12 in the sprocket 10.

FIG. 4 illustrates the trajectory of the core bar 22 relative to the sprocket 10 when the elastic crawler 20 is driven by rotating the sprocket 10 in the backward rotation direction $D_b$. Upon the sprocket 10 rotating in the backward rotation direction $D_b$, the elastic crawler 20 is wrapped around the sprocket 10 in the opposite direction than in FIG. 3, causing the core bar 22 to enter perpendicularly into the tooth groove formed between two teeth 12 of the sprocket 10 along the arrow $d_1$ while moving along an involute curve from the opposite side than in FIG. 3.

In this embodiment, the tooth base surface 12*b* of the tooth 12 in the sprocket 10 is inclined relative to the angle $A_1$. This angle $A_1$ is in a range from 0° to 7.5° (0°$\leq A_1 \leq$7.5°). Therefore, in this case as well, even if the core bar 22 wrapped around the elastic crawler 20 moves along an involute curve, the core bar 22 enters perpendicularly into the tooth groove formed between two teeth 12 while reducing contact with the tooth base surface 12*b*, in the forward rotation direction, of the right tooth 12 in the sprocket 10 and contact with the tooth base surface 12*b*, in the backward rotation direction, of the left tooth 12. The angled surface 22*b*, of the core bar 22, to the left in FIG. 4 (the angled surface in the forward rotation direction) then catches on and engages with the root surface 12*a*, in the backward rotation direction, of the left tooth 12 in the sprocket 10. In other words, in this embodiment, the core bar 22 of the elastic crawler 20 can engage with the sprocket 10 while hardly contacting the tooth base surfaces 12*b* of the teeth 12 in the sprocket 10 even when the sprocket 10 is rotated in the backward rotation direction $D_b$. As a result, the sprocket 10 can drive the elastic crawler 20 in the backward rotation direction $D_b$ by transmitting the driving force to the elastic crawler 20 through the sprocket 10.

Upon further rotation of the sprocket 10, the wrapped elastic crawler 20 is released from the sprocket 10 at the bottom of the sprocket 10 (not illustrated). At this time, when the core bar 22 of the elastic crawler 20 separates from the tooth groove of the sprocket 10 after the core bar 22 and the teeth 12 of the sprocket 10 have been engaged, the core bar 22 traces a trajectory in the direction of the arrow $d_2$ along an involute curve. By tracing such a trajectory, the core bar 22 also has less contact with the tooth base surfaces 12*b* of the teeth 12 in the sprocket 10 when the wrapped elastic crawler 20 is released from the sprocket 10. Accordingly, upon further rotation of the sprocket 10, the core bars 22 of the elastic crawler 20 can also be released from engagement with the sprocket 10 almost without contact with the tooth base surfaces 12*b* of the teeth 12 in the sprocket 10.

In this way, with the sprocket 10 and elastic crawler drive mechanism 100 according to this embodiment, on the tooth face F of the tooth 12 of the sprocket 10, a portion of the tooth base on at least one side of the center line $O_1$ of the tooth 12 is the tooth base surface 12*b*, and the tooth base surface 12*b* is inclined relative to the center line $O_1$ of the tooth 12 at the angle $A_1$ in a range of 0° or greater to 7.5° or less so as to approach the center line $O_1$ of the tooth 12 towards the tooth tip surface 12*d*. Consequently, the engaging surfaces (22*a*, 22*b*) of the core bar 22 engage with the sprocket 10 while hardly contacting the tooth base surfaces 12*b* of the sprocket 10, thereby reducing wear of the sprocket 10 and the core bar 22. This reduction of wear is effective for preventing tooth jumping at the time of power transmission and for improving durability. According to this disclosure, the sprocket 10 with reduced wear can be provided, and the elastic crawler drive mechanism 100 using this sprocket 10 with reduced wear can also be provided.

In the sprocket 10 of this embodiment, on the tooth face F of the tooth 12, the tooth end surface 12*c* between the tooth base surface 12*b* and the tooth tip surface 12*d* is inclined relative to the center line $O_1$ of the tooth 12 at the angle $A_2$ in a range of 22.5° or greater to 35° or less ($22.5° \leq A_2 \leq 35°$) so as to approach the center line $O_1$ of the tooth 12 towards the tooth tip surface 12*d*.

In this case, the tooth end surface 12*c* is tapered towards the tooth tip surface 12*d*. Therefore, from when the sprocket 10 starts to engage with the core bar 22 until the engagement is complete, or from engagement with the core bar 22 until disengagement, contact between the core bar 22 and the tooth end surface 12*c* can be prevented. Also, any foreign material that is introduced is less likely to be caught. The progression of wear of the sprocket 10 can thus be reliably slowed down.

In the sprocket 10 according to this embodiment, a connecting portion 12$c_1$ of the tooth end surface 12*c* connecting to the tooth tip surface 12*b* is a curved surface protruding outward from the tooth 12. In this case, from when the sprocket 10 starts to engage with the core bar 22 until the engagement is complete, or from engagement with the core bar 22 until disengagement, contact with the core bar 22 can be more reliably prevented also near the tooth tip surface 12*d* on the tooth end surface 12*c* of the tooth 12 in the sprocket 10. The progression of wear of the sprocket 10 can thus more reliably be slowed down.

In the sprocket 10 according to this embodiment, the connecting portion 12$b_1$ between the tooth base surface 12*b* and the tooth end surface 12*c* protrudes outward from the tooth 12.

In this case, when the sprocket 10 begins to engage with the core bar 22, or when engagement with the core bar 22 is ended, contact between the connecting portion 12$b_1$ and the core bar 22 is avoided, thereby even more reliably slowing down the progression of wear of the tooth face F.

The elastic crawler drive mechanism 100 according to this embodiment in FIG. 2 includes the sprocket 10 and the elastic crawler 20 with the plurality of core bars 22 on the elastic endless belt 21, the core bars 22 being capable of engaging with the sprocket 10. On the tooth face F of the sprocket 10, the root surface 12*a* between the tooth bottom surface 11*a* of the sprocket 10 and the tooth base surface 12*b* is a curved surface recessed inward towards the tooth 12. At least a portion (angled surface 22*b*) of each engaging surface (edge surface 22*a*, angled surface 22*b*) of the core bar 22 with the sprocket 10 is a curved surface protruding outward. Furthermore, the curved surface of the root surface 12*a* of the sprocket 10 and the angled surface (curved surface) 22*b* of the core bar 22 are shaped to correspond to each other.

In the elastic crawler drive mechanism 100 according to this embodiment, the contact area between the sprocket 10 and the core bars 22 is increased, allowing improvement in the durability of the sprocket 10 by reducing stress due to the driving force.

Figure 5:
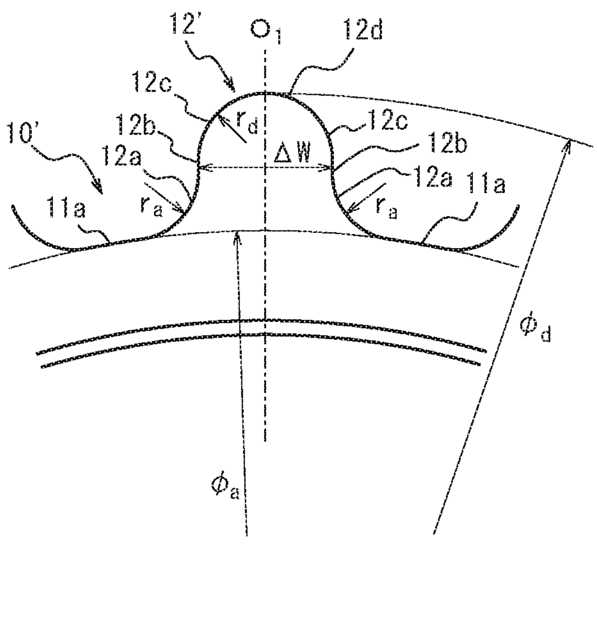
FIG. 5 is a side view schematically illustrating an enlargement of one tooth in a sprocket according to Embodiment 2.

FIG. 5 is a side view schematically illustrating an enlargement of one tooth 12', among a plurality of teeth 12', in a sprocket 10' according to Embodiment 2. Portions that are substantially the same as the above embodiment are labeled with the same reference signs, and a detailed description thereof is omitted.

In the sprocket 10' according to this embodiment, the shape of the tooth 12' is different than in the sprocket 10 in FIG. 1A. In this embodiment, the two tooth end surfaces 12*c* and the tooth tip surface 12*d* are curved to protrude outward from the tooth 12. The tooth end surfaces 12*c* and the tooth tip surface 12*d* are integrally formed as a curved surface with a radius of curvature $r_d$.

The radius of curvature $r_d$ of the root surface 12*a* in this embodiment may be within a range of 15 mm to 25 mm (15 mm$\leq r_d \leq$25 mm). An example of a specific radius of curvature $r_d$ is 16 mm. The radius of curvature $r_a$ may be within a range of 10 mm to 20 mm (10 mm$\leq r_a \leq$20 mm). An example of a specific radius of curvature $r_a$ is 16 mm. In this embodiment, the tooth base surfaces 12*b* stand perpendicularly to the tooth bottom surface 11*a*, and the interval $\Delta W$ between the tooth base surfaces 12*b* is 34 mm. The interval $\Delta W$ may, however, be adjusted as necessary. In this embodiment, a specific example of the tooth tip diameter $\phi_d$ is 480 mm, and a specific example of the tooth bottom diameter $\phi_a$ is 410 mm.

The portions of this embodiment that are the same as in Embodiment 1 (the portions with the same reference signs) achieve the same effects as in Embodiment 1.

While embodiments of this disclosure have been described, a variety of changes may be made within the scope of the patent claims. For example, when the sprocket 10 (10') only rotates in one direction, only one of two tooth faces F forming one tooth 12 (12') may include the tooth base surface 12*b* and other surfaces according to this embodiment. The elastic crawler 20 of this disclosure may be formed by embedding a steel cord layer in the endless belt 21. The elastic crawler 20 may also have an elastic projection structure by disposing elastic (rubber) projections on the endless belt 21 instead of the core bars 22, with a portion of the elastic projections being engaging portions, like the core bars 22. Furthermore, the various configurations and arrangements adopted in the above embodiments may be combined or exchanged as necessary. The material configuring the engaging portions is not limited to the above-described material. For example, core bars made of resin may also be used.

INDUSTRIAL APPLICABILITY

This disclosure may be adopted in a sprocket capable of engaging with a plurality of protrusions provided on an elastic, endless belt and may be adopted in an elastic crawler drive mechanism that uses the sprocket.

REFERENCE SIGNS LIST

10 Sprocket
10' Sprocket
11 Disk
11*a* Tooth bottom surface
12 Tooth
12*a* Root surface
12*b* Tooth base surface
$\mathbf{12}b_1$ Connecting portion of tooth base surface to tooth end surface
12*c* Tooth end surface
$\mathbf{12}c_1$ Connecting portion of tooth end surface to tooth tip surface
12*d* Tooth tip surface
20 Elastic crawler
21 Endless belt
22 Core bar (engaging portion)
22*a* Edge surface (engaging surface)
22*b* Angled surface (portion of engaging surface)
23 Housing
100 Elastic crawler drive mechanism
$A_1$ Angle of tooth base surface
$A_2$ Angle of tooth end surface
F Tooth face
$O_1$ Center line of tooth
$O_2$ Center line of core bar
$r_a$ Radius of curvature of root surface
$r_b$ Radius of curvature of connecting portion of tooth base surface to tooth end surface
$r_c$ Radius of curvature of connecting portion of tooth end surface to tooth tip surface
$r_d$ Radius of curvature of tooth end surface and tooth tip surface

The invention claimed is:

1. A sprocket capable of engaging with a plurality of engaging portions on an elastic endless belt, each of the engaging portions including an edge surface and a bottom surface, and being tapered from the bottom surface towards the edge surface, the sprocket comprising a tooth, the tooth including two tooth faces tapered from a tooth bottom surface towards a tooth tip surface and are symmetrical about a center line of the tooth, wherein:

each of the two tooth faces includes:

a root surface connecting to the tooth bottom surface,
a tooth base surface connecting to the root surface, and
a tooth end surface connecting to the tooth base surface, and at least one of the tooth base surfaces of the two tooth faces is inclined relative to the center line of the tooth at an angle in a range of greater than 0 to 7.5 or less so as to approach the center line of the tooth towards the tooth tip surface.

2. The sprocket of claim 1, wherein the tooth end surface between the tooth base surface and the tooth tip surface is inclined relative to the center line of the tooth at an angle in a range of 22.5 or greater to 35 or less so as to approach the center line of the tooth towards the tooth tip surface.

3. The sprocket of claim 2, wherein a connecting portion of the tooth end surface connecting to the tooth tip surface is a curved surface protruding outward from the tooth.

4. The sprocket of claim 3, wherein a connecting portion between the tooth base surface and the tooth end surface protrudes outward from the tooth.

5. An elastic crawler drive mechanism comprising:

the sprocket of claim 4; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

6. The sprocket of claim 2, wherein a connecting portion between the tooth base surface and the tooth end surface protrudes outward from the tooth.

7. An elastic crawler drive mechanism comprising:

the sprocket of claim 6; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

8. An elastic crawler drive mechanism comprising:

the sprocket of claim 2; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

9. An elastic crawler drive mechanism comprising:

the sprocket of claim 3; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

10. The sprocket of claim 1, wherein a connecting portion between the tooth base surface and the tooth end surface protrudes outward from the tooth.

11. An elastic crawler drive mechanism comprising:

the sprocket of claim 10; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

12. An elastic crawler drive mechanism comprising:

the sprocket of claim 1; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

13. The elastic crawler drive mechanism of claim 12, wherein the engaging portion on the elastic endless belt is configured to enter perpendicularly into a tooth groove formed between two teeth of the sprocket and to catch on and engage with the root surface of the tooth of the sprocket while moving along an involute curve.

14. The sprocket of claim 1, wherein each of the tooth surface and the tooth end surface is formed as a flat surface.

15. An elastic crawler drive mechanism comprising:

the sprocket of claim 14; and an elastic crawler with the plurality of engaging portions on the elastic endless belt, the engaging portions being capable of engaging with the sprocket, wherein on the tooth face of the sprocket, the root surface between the tooth bottom surface of the sprocket and the tooth base surface is a curved surface recessed inward towards the tooth, at least a portion of the engaging portion is a curved surface protruding outward from the engaging portion, and the curved surface of the root surface of the sprocket and the curved surface of the engaging portion are shaped to correspond to each other.

16. The elastic crawler drive mechanism of claim 15, wherein the engaging portion on the elastic endless belt is configured to enter perpendicularly into a tooth groove formed between two teeth of the sprocket and to catch on and engage with the root surface of the tooth of the sprocket, while moving along an involute curve.

* * * * *